INVENTORS
HERBERT K. BRUSS
ABUND O. WIST
ATTORNEY

INVENTORS
HERBERT K. BRUSS
ABUND O. WIST

ATTORNEY

United States Patent Office 3,229,506
Patented Jan. 18, 1966

3,229,506
VISCOSITY MEASURING INSTRUMENT
Herbert K. Bruss, 40 Schenck Ave., and Abund O. Wist, 60 Knights Bridge Road, both of Great Neck, N.Y.
Filed Nov. 14, 1962, Ser. No. 237,489
Claims priority, application Germany, Nov. 18, 1961, B 64,840
5 Claims. (Cl. 73—59)

This invention relates to the measurement of the viscosity of liquid and plastic substances and its object is to provide an improved method and apparatus for practicing the method which enables a simple, accurate measurement of viscosity within a large measurement range and make possible a particularly small and compact construction of the measuring instrument.

Viscometers are already known which measure the time which a certain quantity of the substance to be measured requires to flow out of a capillary of known diameter and known length. These capillary viscometers, however, have the disadvantage that they operate only very slowly and are little suited for measuring the viscosity of flowing liquids, the pressure and velocity of flow of which are subject to variations.

Instruments are also known which directly measure and indicate the viscosity by a shearing of the substance to be measured. These so-called rotating viscometers have two concentrically supported cylinders between which the substance to be measured, for instance a sample of oil, is contained. The outer cylinder is driven and rotated at constant velocity around its axis, while the inner cylinder is suspended from a torsion spring and is deflected in an amount proportional to the viscosity of the substance to be measured. These known instruments also have the disadvantage of a very small measuring range and in addition to this, they are very sensitive to disturbances when impurities are contained in the substance to be measured. For the measurement of substances of low viscosity, very large rotating bodies are necessary in the known instruments, the great inertia and friction of which impair the precision of the measurement.

All of these disadvantages are avoided by the present invention by producing and measuring in a measurement cell through which the substance to be measured flows, a dynamic pressure which serves as a measure of the viscosity of the substance to be measured.

This method has, first of all, the advantage that the viscosity of flowing liquids can be measured rapidly and precisely over a large measurement range independently of its pressure and its velocity of flow.

This method also has the advantage that the influence of impurities in the substance being measured on the operation of the measurement instrument is done away with.

In accordance with the invention, the dynamic pressure may be produced by means of an impeller which is arranged within the measurement cell and is driven by an electric motor. This embodiment has the advantage that the instrument can be made very small and simple and can be installed in vertical or horizontal position in boilers or pipelines without the precision of the measurement being thereby impaired.

Another advantage of the invention is that the viscometer can be arranged in a bypass of a main line without an additional pump being necessary to equalize the difference in pressure in the main and bypassed lines.

Since the instrument in accordance with the invention is continuously traversed by the substance to be measured, there is a rapid exchange of the liquid to be measured in the measurement cell so that every change in viscosity is immediately indicated.

In order to cover the largest possible measurement range with the same instrument, it is furthermore proposed, in accordance with the invention, to cause the substance to be measured to flow out through a nozzle, slot or capillary. Several of these nozzles or capillaries, which differ from each other in the size of their aperture and the length of the capillary and are interchangeable with each other, are kept in stock. In this way, it is possible by replacing the capillaries to adapt the measurement range of the instrument to the viscosity of the substance to be measured. For the measuring of liquids of low viscosity, the measurement instrument therefore is provided with a narrow, long capillary. If, on the other hand, a liquid of high viscosity is to be measured with the same instrument, the narrow, long capillary is replaced by a short capillary or nozzle of large outlet cross section.

Even in the case of liquids of high viscosity, only slight friction is produced upon flow through the measurement cell and the return flow of the substance being measured within the measurement cell between the cell wall and the outer circumference of the spindle is substantially avoided.

The measurement instrument can be cleaned easily and simply by passing a solvent through the measurement cell instead of the substance to be measured.

Further features of the invention concern the development of the indicating devices and the temperature control of the measurement cell and are set forth in the subordinate claims.

The invention will be further explained by way of example by reference to the drawings, in which FIG. 1 is a longitudinal section through a viscometer in accordance with the invention;

Figure 1:
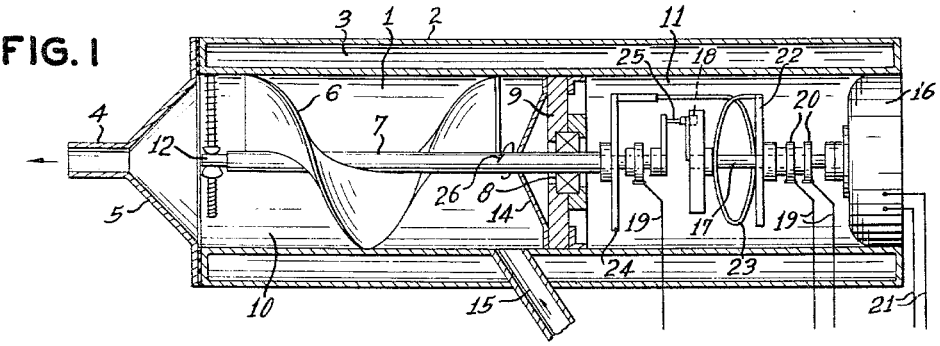

Referring to FIG. 1, 1 is the measurement cell, which consists of a cylindrical pipe and is surrounded by a housing 2. Between the measurement cell 1 and the housing 2, there is the temperature control space 3 in which thermostatic devices of known type and not described in detail, such as thermocells and the like are installed in an explosion-proof manner, controlled, for instance, by an electric thermometer so as to maintain the temperature of the substance to be measured flowing through the measurement cell 1, constant at a predetermined value.

To the one end of the measurement cell 1, there is connected a capillary tube 4 which has its funnel-shaped end 5 fastened in detachable liquid-tight manner to the measurement cell 1. The connection can be effected, for instance, by a thread or by flanging, and has not been shown in detail. The capillary tube 4 can be replaced by another tube of different diameter and length or by a nozzle or a funnel adapted with slot opening.

Within the measurement cell 1, there is an impeller 6, hereinafter referred to as a spindle, the shaft 7 of which is rigidly connected with the spindle and is supported at one end in a ball bearing 8 which is borne by the partition 9 which divides the measurement cell 1 into two chambers 10 and 11. The other end of the spindle shaft 7 is guided in a plain bearing 12 which is preferably a self-aligning bearing and is borne by springs arranged in star shape. This development permits self-alignment of the bearing, as a result of which the friction of the spindle 6 on the inner wall of the measurement cell 1 is reduced to a minimum.

Alongside the partition 9 in the chamber 10 there is arranged a packing ring 14 which prevents the measuring substance from reaching the ball bearing 8 and the chamber 11 of the measurement cell 1. Below the packing ring 14, an inlet connection 15 passes through the walls of the housing 2 and of the measurement cell 1 and permits the substance to be measured to enter the chamber 10.

In the chamber 11, there is arranged on the end of the measurement cell 1 an electric motor 16. The motor 16 is arranged as an end closure for the chamber 11. The electric motor 16 serves as drive member for the spindle 6 and is preferably a synchronous motor so that it always operates at constant speed. The rotor shaft of the motor 16 is connected with a shaft 17 which extends freely into the chamber 11 of the measurement cell 1 and bears on its outer end a potentiometer 18 which is in the form of a circular disc. The measured voltage is taken via lines 19 from the slide contacts 20, while the electric motor 16 is connected to the power lines by two wires 21.

On shaft 17 there is also seated a disc 22 to the outer periphery of which the one end of a spiral spring 23 is fastened. The other end of the spiral spring 23 is rigidly connected to the outer edge of a second disc 24 which is keyed onto the spindle shaft 7. The spindle shaft 7 furthermore bears on its one end thereof extending into the chamber 11, an eccentrically arranged contact, for instance a small precious-metal-type wiper 25 which slides on the resistance element of the potentiometer 18.

The manner of operation of the viscometer is as follows:

The substance to be measured, for instance petroleum, is introduced into the measurement cell 1 through the inlet connection 15. It flows through the chamber 10 and discharges through the capillary tube 4 from the measurement cell 1. For the viscosity measurement, a torque is exerted by the electric motor 16 on the shaft 17 and is transmitted by the spiral spring 23 to the spindle axis 7. By the rotation of the spindle 6 in the direction indicated by the arrow 26, the substance to be measured is moved to the left in the chamber 10 and passes into the funnel-shaped portion 5 of the capillary tube 4. Since more substance to be measured is conveyed by the spindle 6 into the funnel-shaped connection 5 than can emerge through the capillary tube 4, there is produced in the funnel 5 and in the lower part of the chamber 10 a dynamic pressure which is proportional to the viscosity of the substance to be measured and controls the rotation of the spindle 6, i.e. the spindle 6 must overcome greater friction. Since the spindle axis 7 is connected with the shaft 17 by a spring 23, the spindle axis 7 lags behind the movement of the shaft 17 by a certain angle of rotation until the tension of the spring 23 is sufficiently great to carry the spindle axis 7 along with it. In this connection, the small wiper 25 is also deflected and the resistance of the potentiometer 18 and thus also the measurement voltage are varied. The change in the measurement voltage is then a measure of the viscosity of the measurement substance flowing through the chamber 10 and can be indicated by suitable indicating instruments of known type. The indicating instruments, which are not described in detail, need not be arranged directly on the viscometer but may also be located at a remote point, for instance on a central control board.

Figure 2:
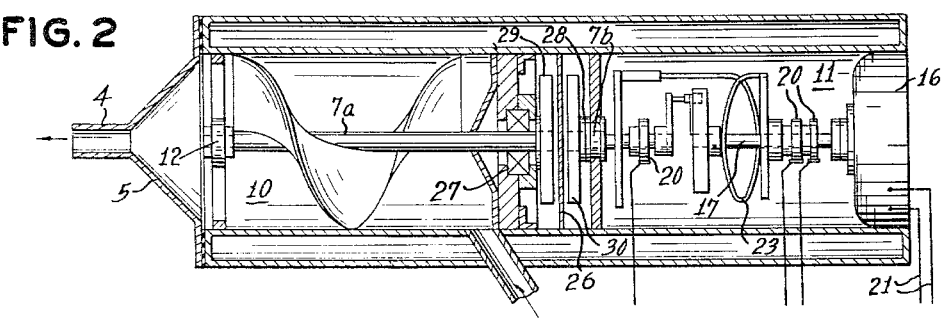
FIG. 2 shows the viscometer of FIG. 1 in a somewhat different embodiment.

In FIG. 2, the chambers 10 and 11 of the measurement cell 1 are separated from each other by a liquid-tight partition 26. The spindle shaft does not pass through said partition, but consists of two parts 7a and 7b, the one part 7a of which is arranged in the chamber 10 and guided in the bearings 12 and 27, while the other part 7b is supported coaxial to the spindle-shaft part 7a in chamber 11 in a plain bearing 28. On its ends facing the partition 26, the shaft parts 7a and 7b bear magnets 29 and 30 so that the torque exerted by the shaft 17 by means of the spiral spring 23 on the part 7b of the spindle shaft is transmitted by a magnetic field through the partition 26 to the part 7a of the spindle shaft. This embodiment has the advantage that the measurements can be carried out in the chamber 11 even under pressure or in vacuum. Otherwise, the viscometer of FIG. 2 is identical in construction and manner of operation to the embodiment shown in FIG. 1.

Figure 3:
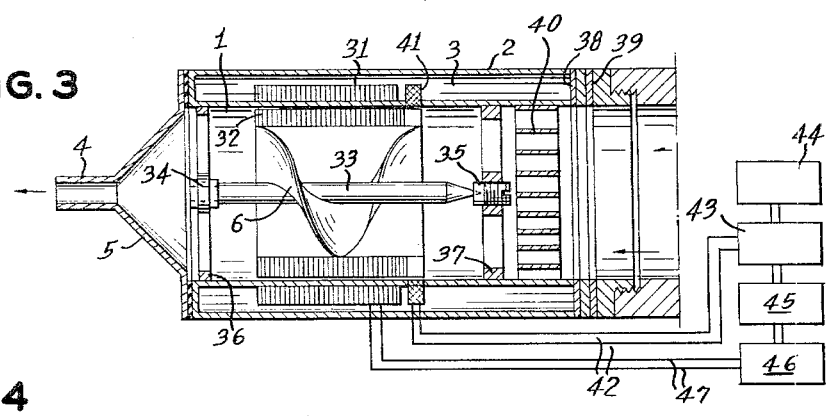
FIG. 3 is another embodiment of the invention in longitudinal section.

The embodiment shown in FIG. 3 is characterized by a particularly simple and compact construction. In contra-distinction to the embodiments in FIGS. 1 and 2, the viscosity is not determined by the change in a measurement voltage but rather the consumption by the electric motor of active current serves directly as a measure for the viscosity, which is proportional to the dynamic pressure produced in front of the nozzle or capillary.

As shown by FIG. 3, the substance to be measured is fed axially to the measurement cell 1. The measurement cell 1, which is formed, in the same way as in FIGS. 1 and 2, of a cylindrical pipe, bears on its outer periphery the stator 31 of an electric motor which is preferably a series-wound D.C. motor. The rotor 32 is seated on the outer periphery of the spindle 6 within the measurement cell 1. The rotor 32 and the spindle 6, therefore, have a common shaft 33 which is guided at its one end in a plain bearing 34 and at its other end in a conical or pivot bearing 35. The bearings 34 and 35 are each borne by a spider 36, 37 which afford only slight resistance to the substance to be measured which flows through the measurement cell.

The measurement cell 1 is surrounded in the same way as in the embodiment shown in FIGS. 1 and 2 by a housing 2. It is provided at its inlet end with a dust collector 38 and a magnetic dust precipitator 39 and is threaded, for instance, to an oil line or fastened in some other liquid-tight manner to such a line. A capillary tube 4 having an end 5 which flares out in funnel fashion is arranged at the outlet end of the cell 1 as described above with reference to FIG. 1. Between the spider 37 and the dust collector 38 there are arranged honeycomb-like temperature control compartments 40 in which, for instance, thermocells are installed so as to bring the measurement substance flowing into the instrument between the temperature control compartments 40 immediately to the desired temperature. In the temperature control space 3 there are arranged in addition to the stator 31 temperature control means (not shown in detail) and a counting magnet 41 which counts the revolutions of the spindle 6 and of the rotor 32. The counting magnet 41 is connected via wires 42 with a comparator 43. To the comparator 43 there is connected a frequency standard 44 and a converter 45. The converter 45 is connected with an amplifier 46 which is connected via a wire 47 to the stator 31 of the electric motor.

The manner of operation of the apparatus shown in FIG. 3 is as follows:

The substance to be measured is fed axially to the measurement cell 1 at its one end and first of all passes the magnetic precipitator 39 and the dust collector 38 where any impurities contained in the substance to be measured are removed. It then passes through the temperature control compartments 40 and brought by them to the predetermined temperature. The measurement substance is conveyed by the spindle 6 into the funnel-shaped extension 5 and emerges from the measuring instrument through the capillary tube 4.

The electric motor is so controlled electronically that its speed of rotation remains substantially constant. For this purpose, the counting magnet 41 sends out over the line 42 a number of pulses which is proportional to the speed of rotation of the motor 32. The pulses arrive at the comparator 43 and are compared with a frequency standard 44.

If a dynamic pressure is produced in the funnel-shaped extension 5 and in the lower part of the measurement cell 1, the friction which must be overcome by the spindle 6 and the rotor 32 is increased. As a result, the speed of rotation of the electric motor drops and the frequency of the pulses sent out by the counting meter 41 is reduced. The frequency differences determined by comparison with the frequency standard are then converted by the converter 45 into electrical voltage and fed via the amplifier to the motor in order to maintain the speed of rotation. The amplifier 46 is designed so that resistances to rotation of the motor which are not caused by the viscosity of the substance being measured are without effect on the electronic control. The consumption of active current by the electric motor is then a measure of the viscosity of the substance being measured.

Figure 4:
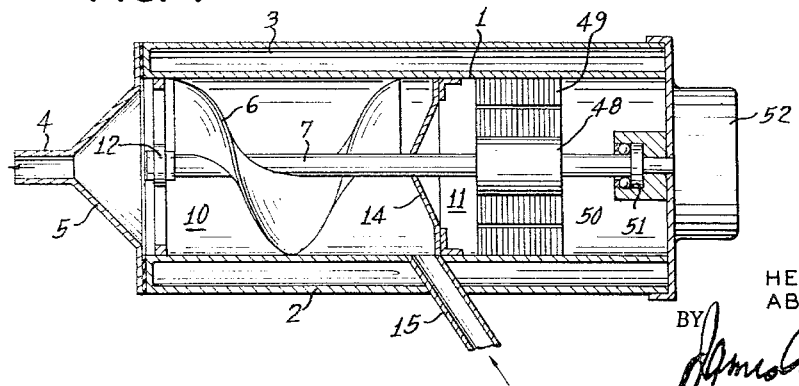
FIG. 4 is a third embodiment of the invention also in longitudinal section.

In the embodiment shown in FIG. 4, the rotor 48 of the electric motor is seated directly on a spindle shaft 7 and the stator 49 is within the measurement cell 1. The spindle shaft 7 has its one end supported in a plain bearing 12 and its other end in a pivot bearing 50, the bearing plate 51 of which is connected with a pressure pickup 52. The measurement cell 1 is subdivided by the gasket 14 into two chambers 10 and 11. In the temperature control chamber 3, between the walls of the measurement cell 1 and the housing 2, temperature control devices of known type are arranged as in the embodiments previously described.

The manner of operation of the apparatus shown in FIG. 4 is as follows:

The substance to be measured enters the measurement cell 1 through the inlet connection 15, flows through the chamber 10 and leaves it through the capillary tube 4.

The spindle shaft 7 on which the rotor 48 is seated is driven directly by the electric motor at a constant speed of rotation in the direction indicated by the arrow 26. In this way, the substance to be measured is conveyed by the spindle 6 into funnel-shaped extension 5 where a dynamic pressure is produced. By this dynamic pressure, the spindle 6 is pushed in axial direction towards the right and the right-hand end of the spindle shaft 7 presses against the bearing plate 51 of the pivot bearing 50. The dynamic pressure which is proportional to the viscosity can be read off directly from the pressure pickup 52 or can be transmitted electrically to a suitable indicating instrument. It is also possible to measure and indicate by pointer the axial path of displacement of the spindle shaft 7 rather than the pressure which the spindle shaft 7 exerts on the bearing plate 51.

Figure 5:
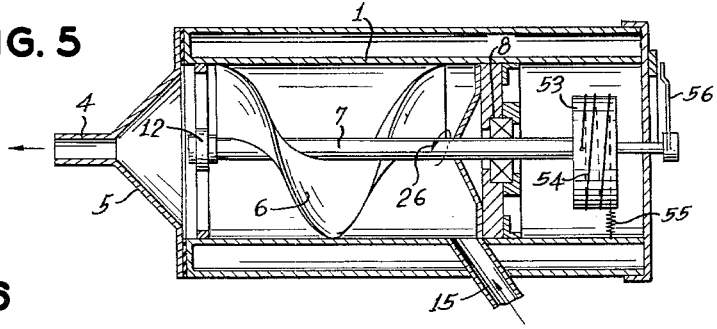
FIG. 5 shows a viscometer in accordance with the invention without motor.

If the line pressure under which the substance to be measured is fed to the measurement cell 1 is constant, the viscometer may also be operated without a motor, as shown in FIG. 5.

As can be noted from FIG. 5, the spindle shaft 7 is guided, as in FIG. 1, in a plain bearing 12 and a ball bearing 8. The spindle shaft 7 bears at its one end a pulley 53 over which there is placed a tensioning cord 54 one end of which is fastened to the pulley and the other end to a tension spring 55. The pulley 53 bears a pointer 56 which extends out of the measurement cell 1. If the substance to be measured is fed under constant pressure through the inlet connection 15 to the measurement cell 1, it flows against the helical surface of the spindle 6 and endeavors to turn the latter in the direction indicated by the arrow 26. In this connection, the pointer 56 fastened to the pulley 53 is deflected until the tension cord 54 which winds up on the pulley 53 has tensioned the tension spring 55 to such an extent that the spring force and the circumferential forces exerted on the spindle shaft are in equilibrium. By means of the pointer 56, the viscosity can then be read directly from a suitable scale.

Figure 6:
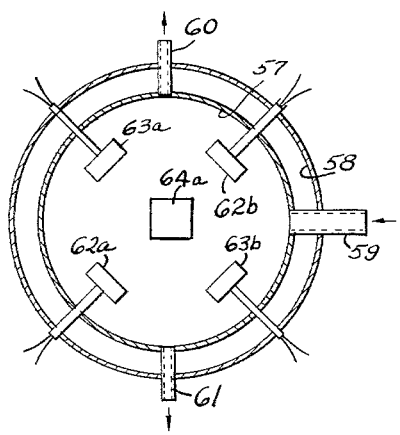
FIG. 6 is a view in transverse section of a fourth embodiment of the invention.
Figure 7:
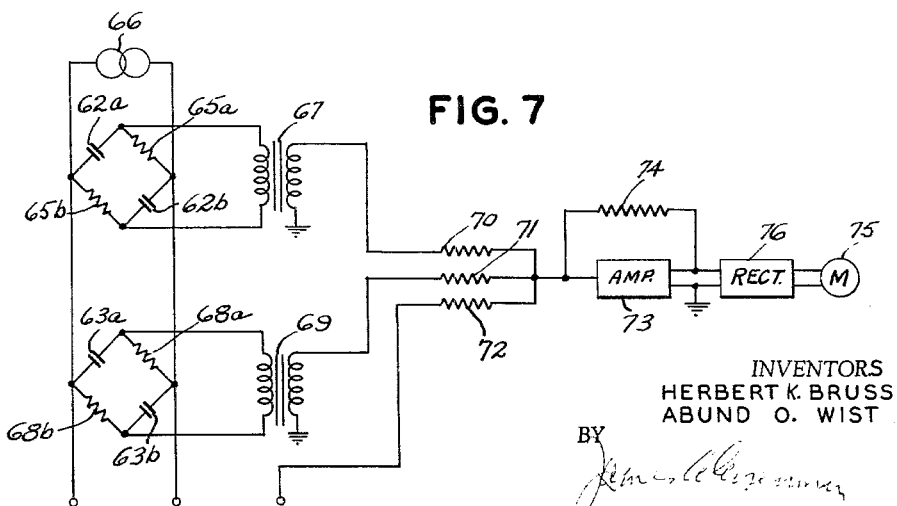
FIG. 7 is a circuit diagram illustrating a circuit for obtaining output readings in terms of viscosity for the embodiment of FIG. 6.

Referring to FIGS. 6 and 7, there is illustrated a fourth embodiment of the invention which is particularly useful in applications in which acceleration forces are a factor which normally introduces spurious signals. The arrangement of FIG. 6 includes a fluid cell 57 preferably of spherical contour enveloped by a temperature regulating jacket 58 and having an input conduit 59. A pair of output conduits 60 and 61 are arranged at opposite ends of an axis perpendicular to the axis of the input 59 and having a total combined flow capacity which is substantially less than the input conduit 59 so that upon the introduction of a constant flow of a fluid, pressure will be generated within the cell 57 which is a function of viscosity. Three pairs of pressure transducers 62a–62b, 63a–63b and 64a–64b (only the former of which is illustrated in FIG. 6) are arranged at opposite ends of three mutually perpendicular axes passing through the cell. Each pressure transducer will sense fluid pressure within the cell and the output of any one or the sum of all of the outputs will be directly proportional to the viscosity of the fluid passing through the cell.

In order to render the system responsive to pressure values attributable solely to viscosity of the fluid but insensitive to pressures which might be generated within the cell as a result of acceleration or deceleration of the entire cell system along any axis, the outputs of all of the transducers are additively combined to cancel the acceleration components.

Referring to FIG. 7, the transducers 62a and 62b are connected in a bridge circuit with resistors 65a and 65b as shown, the transducers constituting opposite arms of the bridge. The resistors 65a and 65b may be of the temperature compensating type. An A.C. source 66 is connected across one diagonal of the bridge circuit, and the output which appears across the other diagonal is applied to the primary of an isolation transformer 67. The transducers 63a and 63b are similarly arranged in a bridge circuit with resistors 68a and 68b, excited by the source 66 and provided with an output isolation transformer 69. A third similar arrangement (not shown) is provided with transducers 64a and 64b.

The outputs of the above-described circuits are connected to an adding circuit of conventional type, comprising respective series resistors 70, 71, and 72 and an amplifier 73 provided with a negative feedback circuit including a resistor 74. The output of the amplifier 73 is equal or proportional to the sum of the outputs of the bridge circuits, and may be indicated by any suitable means such as a D.-C. meter 75 preceded by a rectifier 76.

In the operation of the device of FIG. 6 in the absence of acceleration, the electrical impedances of all the transducers 63a, etc. are equal, and differ from that of the resistors 65a, etc. by an amount dependent upon the fluid pressure in the cell. The bridges are unbalanced accordingly, and provide output signals representative of the pressure. The sum of the outputs also represents the pressure, which is indicated by the meter 75 in terms of fluid viscosity.

Acceleration in any direction produces a force that can be resolved into components along the axis of the respective pairs of transducers. Suppose these to be an acceleration on the axis of transducers 62a and 62b, in the direction of 62a. The pressure on transducer 62a will be reduced by an amount proportional to the acceleration, and the pressure on transducer 62b will be increased by the same amount. The respective impedances will change accordingly in opposite senses, tending to unbalance the bridge equally in opposite senses. The net effect is to substantially cancel the acceleration response. Since each pair of transducers similarly eliminates response to acceleration in either direction along its respective axis, the sum of the bridge signals is independent of acceleration and is a measure only of the pressure attributable to viscosity.

The invention is not limited to the embodiments shown. For instance, the spindle 6 can have the form of a propeller, a turbine blade or a worm. In the latter case, the measurement substance which flows back between the wall of the measurement cell and the outer periphery of the worm is also subjected to shearing. These shearing forces, which are also dependent on the viscosity, influence the measuring and indicating devices and may even be greater than the dynamic pressure produced if the edges of the screw surface are sufficiently wide.

Instead of one capillary or nozzle a plurality thereof may be provided and the measurement substance can be fed to the spindle also by means of a piston if the measurement substance is no longer fluid but plastic.

Instead of employing the method of the invention for viscosity measurement for production control, it can also be used to examine the rheological and elastic properties in particular of plastics, as a function of different shear stresses. In this case, the spindle can also be rigidly connected with a motor which can produce constant torques of different amount. When this principle of measurement is employed, the speed of emergence of the substance from the capillary or the volume flowing per unit of time through the capillary or the speed of rotation of the rotary body can be measured as a measure of the viscosity.

We claim:

1. A viscometer comprising an enclosed cell provided with an inlet for admission of a substance to be measured and an outlet providing a predetermined restrictive effect on the flow of the substance from said cell, a rotary impeller within said cell for forcing the substance through said outlet, means including an electric motor having a rotor, including said impeller, and a stator for driving said impeller to rotate at a substantially constant speed, and means for measuring the driving force applied to said impeller.

2. The invention set forth in claim 1, including a pair of bearings to support both the rotor and the impeller.

3. The invention set forth in claim 1, said rotor surrounding said impeller concentrically therewith.

4. The invention set forth in claim 1, said rotor and impeller having a common shaft.

5. A viscometer comprising an enclosed cell provided with an inlet for admission of a substance to be measured and an outlet providing a predetermined restrictive effect on the flow of the substance from said cell, a rotary impeller within said cell for forcing the substance through said outlet and means for driving said impeller comprising an electric motor including a rotor within said cell attached to said impeller and a stator outside said cell, and inductive pickoff means responsive to the rotation of said rotor to control the energization of said stator.

References Cited by the Examiner

UNITED STATES PATENTS

| | | | |
|---|---|---|---|
| 913,420 | 2/1909 | Muntzing | 73—59 |
| 1,641,380 | 9/1927 | Geyer | 73—290.1 |
| 1,930,629 | 10/1933 | Stephens | 73—59 |
| 1,942,920 | 1/1934 | Fawkes | 73—59 |
| 2,339,991 | 1/1944 | Hagy | 73—55 |
| 2,354,923 | 8/1944 | McNamee | 73—59 |
| 2,519,378 | 8/1950 | Kilpatrick | 73—59 |
| 2,603,087 | 7/1952 | Hortenau | 73—59 |
| 2,651,566 | 9/1953 | Warner et al. | 73—59 X |
| 2,992,651 | 7/1961 | Krofta | 73—59 X |

DAVID SCHONBERG, *Acting Primary Examiner.*

RICHARD QUEISSER, *Examiner.*